(12) United States Patent
Amano

(10) Patent No.: US 9,116,023 B2
(45) Date of Patent: Aug. 25, 2015

(54) POINTER STRUCTURE

(71) Applicant: Yazaki Corporation, Tokyo (JP)

(72) Inventor: Mikiya Amano, Shimada (JP)

(73) Assignee: Yazaki Corporation, Tokyo (JP)

( * ) Notice: Subject to any disclaimer, the term of this patent is extended or adjusted under 35 U.S.C. 154(b) by 36 days.

(21) Appl. No.: 14/089,072

(22) Filed: Nov. 25, 2013

(65) Prior Publication Data

US 2014/0146516 A1 May 29, 2014

(30) Foreign Application Priority Data

Nov. 26, 2012 (JP) ................................. 2012-257943

(51) Int. Cl.
G01D 13/22 (2006.01)
G01D 11/22 (2006.01)
G01D 13/26 (2006.01)
G01D 11/28 (2006.01)

(52) U.S. Cl.
CPC .............. G01D 13/265 (2013.01); G01D 11/28 (2013.01); *Y10S 116/36* (2013.01)

(58) Field of Classification Search
CPC ...... G01D 13/265; G01D 11/28; Y10S 116/36
See application file for complete search history.

(56) References Cited

U.S. PATENT DOCUMENTS

| 8,919,276 B2* | 12/2014 | Amano ........................ 116/305 |
| 2005/0109261 A1 | 5/2005 | Tanaka et al. |
| 2014/0144368 A1* | 5/2014 | Amano ........................ 116/284 |
| 2014/0146515 A1* | 5/2014 | Amano ..................... 362/23.21 |

FOREIGN PATENT DOCUMENTS

JP 2005-181301 A 7/2005

* cited by examiner

*Primary Examiner* — Stephen F Husar
(74) *Attorney, Agent, or Firm* — Sughrue Mion, PLLC

(57) ABSTRACT

A pointer structure including: a pointer main body 55 arranged for propagating a ray of light, incident from a light source through a light incident region 65 provided closer to a pointer base end, to a pointer visualizing portion 81 closer to a tip thereof; a light-receiving portion 91 provided in the light incident region 65 in one of opposite surfaces of the pointer main body 55; a recess 97 provided in the other surface of the pointer main body 55 and having an inclined bottom surface 93 whose backside serves as a reflection surface 95 for a ray of light incident through the light-receiving portion 91; and extension portions 101 provided in the light incident region 65 in respective side surfaces 99 sandwiched between the one surface and the other surface.

4 Claims, 7 Drawing Sheets

POINTER STRUCTURE

CROSS REFERENCE TO RELATED APPLICATIONS

This application is based on and claims the benefit of Japanese Patent Application No. 2012-257943 filed on Nov. 26, 2012, the contents of which are incorporated herein by reference in its entirety.

BACKGROUND OF THE INVENTION

1. Technical Field

The present invention relates to a pointer structure.

2. Description of the Related Art

There is a known vehicular pointer device having a display, such as a liquid-crystal display (LCD), arranged in a center of a dial plate for a rotary pointer. In the case such a display is disposed frontward of a dial plate for the ordinary rotary pointer, the display can be laid out at or around a center of the dial plate without interfering a view of the display with the pointer.

However, in the case where the dial plate is to indicate important information such as vehicle speed and the display is to show comparatively less significant information such as current time or so, the dial plate is desirably disposed frontward of the display in a manner improving the visibility of the dial plate.

In the pointer device in a type as shown in FIGS. 5A and 5B, an LCD 610 is provided backward of the dial plate 600 formed thereon with an indicator showing, for example, vehicle speeds so that the LCD 610 backward is exposed through an aperture 601 formed in a center of the dial plate 600. Furthermore, the pointer device includes a pointer 620 for pointing an indicator on the dial plate 600, a circuit board 630 carrying electronic components thereon, and an internal mechanism 640 mounted on the circuit board 630 to rotate the pointer 620 (see Patent Document 1, for example).

The pointer 620 is provided extending along from the internal mechanism 640 to the back and main surfaces of the dial plate 600 through, in order, a backside of the LCD 610, an outer periphery of the LCD 610 and a gap between the LCD 610 and the dial plate 600. Namely, the pointer 620 is in a generally S-shape that is folded through between the dial plate 600 and the LCD 610. With this structure, the pointer 620 is not obstructive to a view of the LCD 610 despite the LCD 610 is disposed backward of the dial plate 600.

In the meanwhile, the pointer 620 is desired to emit light spontaneously in order to further improve its visibility. In this case, for example, a plurality of LED light sources are provided on the circuit board 630 in a manner surrounding a rotation shaft of the internal mechanism 640 and, moreover, the pointer 620 is formed by a light guide member as its pointer main body. It can be contemplated to guide a ray of light, incident through a light incident region provided closer to a base end of the pointer main body and received from the light sources closer to the internal mechanism 640, to a pointer visualizing portion closer to a tip of the pointer main body.

FIGS. 6 and 7 are respectively an overall perspective view of and an essential-part plan view and a vertical sectional view, showing a reference example of a pointer main body for a spontaneous light pointer in which a light incident region is provided closer to a pointer base end.

A pointer main body 501 made as a light guide member is formed in a generally S-form, by a pointer neck portion 510 continuing to a pointer visualizing portion 504 closer to a tip through a pointer bend portion 508d and a U-shaped bend portion 506 having three pointer bend portions 508a-508c and continuing to the pointer neck portion 510 in a position closer to the base end. The pointer main body 501 is formed with a light incident region 503 close to the base end thereof in order to propagate an incident ray of light to the pointer visualizing portion 504 closer to the tip.

In the light incident region 503, a light-receiving portion 505 is provided in one (lower surface, in the figure) of vertically opposite surfaces of the pointer main body 501. In the other surface (upper surface, in the figure) of the pointer main body 501, a hole 511 is formed with an inclined bottom surface 507 whose backside serves as a reflection surface 509 for a ray of light incident through the light-receiving portion 505. A boss 513 is provided protruding in the one surface of the pointer main body 501. The boss 513 is received in a positioning hole 517 of the support 515, to thereby place the pointer main body 501 in position on the support 515.

PRIOR ART DOCUMENT

Patent Document

Patent Document 1: JP-2005-181301A

SUMMARY OF THE INVENTION

Problem that the Invention is to Solve

However, in the light incident region 503 of the pointer main body 501, the reflection surface 509 is provided by the hole 511 in order to deflect a ray of light incident through the light-receiving portion 505 toward a longitudinal direction of the pointer main body 501. As a result, wall-thickness reduced points are formed at the light incident region 503 due to the presence of the hole 511, which raises a problem that troubles, such as short shot or surface sink, are liable to occur during forming a pointer. On the contrary, if the pointer main body 501 is widened uniformly in order to ensure a required cross-sectional area of resin flow path, the pointer itself is size-increased to incur a weight increase together with an increase of pointer drive power of the internal mechanism. This may result in a size increase of and cost rise on the pointer device overall.

The present invention has been made in view of the above circumstances and aims at providing a pointer structure capable of suppressing the occurrence of troubles upon forming without the need of size increase.

Means for Solving the Problem

According to one aspect of the invention, there is provided a pointer structure comprising:

a pointer main body configured to propagate a ray of light, incident through a light incident region provided closer to a pointer base end, to a pointer visualizing portion closer to a tip thereof;

a light-receiving portion provided in the light incident region in one of opposite surfaces of the pointer main body;

a recess provided in the other surface of the pointer main body and having an inclined bottom surface whose backside serves as a reflection surface for a ray of light incident through the light-receiving portion; and extension portions provided in the light incident region in respective side surfaces sandwiched between the one surface and the other surface.

According to the pointer structure configured as defined above, extension portions are provided in both side surfaces sandwiched between one surface and the other surface of the pointer main body in a light incident region, and therefore a cross-sectional area of resin flow path between the recess and the extension portions is increased in the pointer main body. This reduces the resistance to resin flow and improves the fluidity of resin during forming a pointer, which results in less occurrences of troubles during forming.

The extension portions may be semi-circular cylinders whose generating lines extend parallel with a direction of forming the recess.

According to the pointer structure configured as described above, upon injecting a resin to the extension portions during forming a pointer, die surfaces for extension portions define part of a circularly cylindrical plane, resulting in the fact that the resistance to resin flow is reduced as compared to an expansion shape with corners.

The extension portions may have a center positioned offset reverse in direction to traveling of a reflection ray of light with respect to a center of the reflection surface.

According to the pointer structure configured as described above, the extension portions have their center positioned deviated from the center of the reflection surface in a manner coincident with one end of the reflection surface, i.e. a lower end of the inclined bottom surface deepest in the recess. Thus, the pointer main body has a cross-sectional area of resin flow path increased and hence a resistance to resin flow decreased, around the one end of the reflection surface where the cross-sectional area of the pointer main body becomes smaller.

Protuberances may be provided protruding in the respective side surfaces nearby the extension portions so that the pointer main body can be secured on a support by engaging the claws of the support with the protuberances.

According to the pointer structure configured as the above (4), the pointer main body is secured on the support by engaging the claws respectively with protuberances protruding in both side surfaces of the pointer main body. Incidentally, although the protuberances protruding from the respective surfaces somewhat increase the cross-sectional area of resin flow path during forming a pointer, they do not reduce the resistance to resin flow to such an extent that trouble occurrences are suppressed during forming.

According to the pointer structure in the present invention, troubles can be suppressed from occurring during forming without the need of size increase.

The present invention was briefly explained above. The details of the present invention will be further clarified by thoroughly reading Mode for Carrying Out the Invention (hereinafter, referred to as "embodiment") explained below with reference to the attached drawings.

MODE FOR CARRYING OUT THE INVENTION

Hereinafter, an embodiment according to the present invention will be explained with reference to the drawings.

Figure 1:
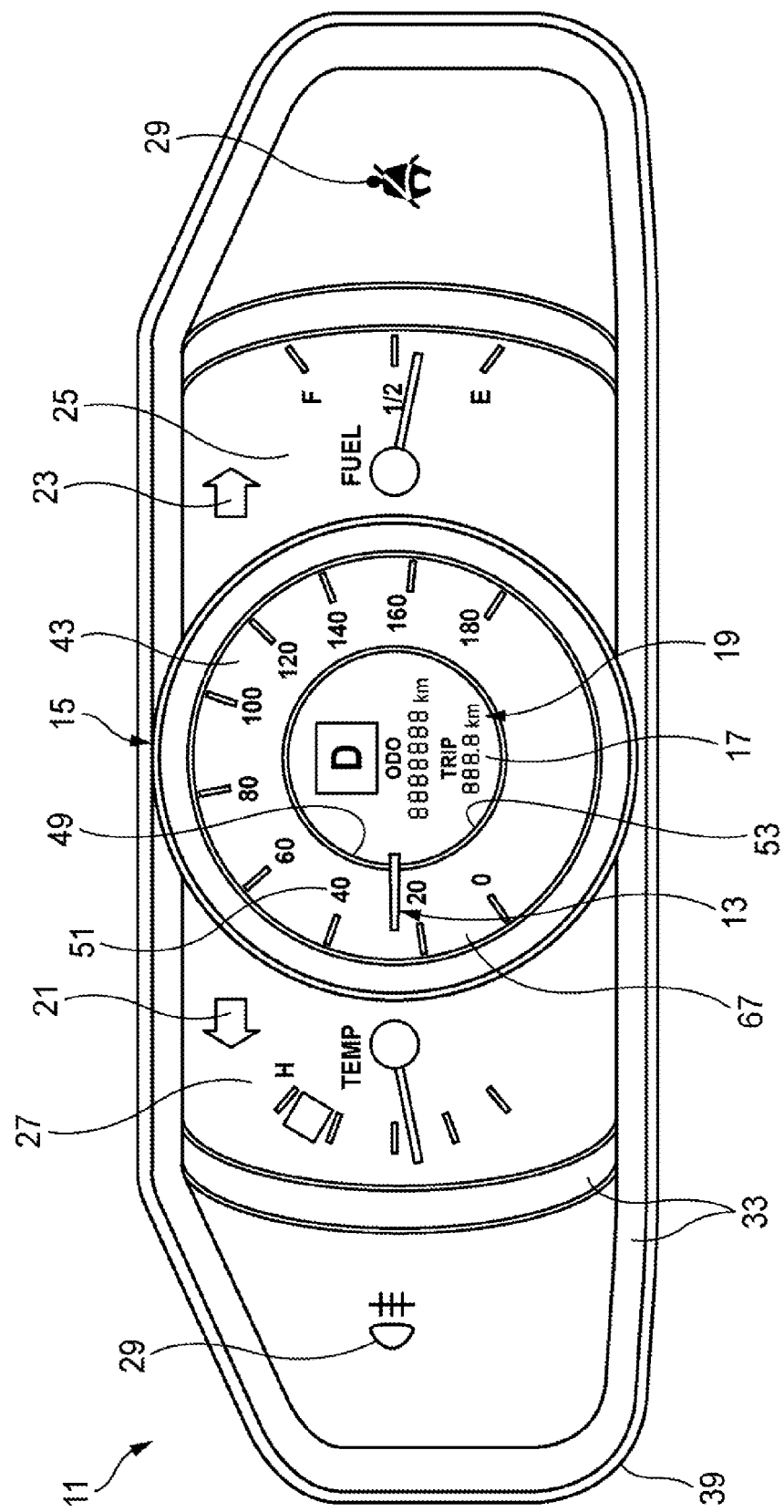
FIG. 1 is a front view of a combination meter provided with a spontaneous light pointer having a pointer structure according to one embodiment of the present invention.

As shown in FIG. 1, a pointer structure in the present embodiment is to be suitably used for a spontaneous light pointer 13 of a combination meter 11. The combination meter 11 is mounted for example in an instrument panel, not shown, of a vehicle. The combination meter 11 is arranged with a speedometer 15 for indicating a speed of a vehicle, a multi-display 19 using an LCD 17 as a display, a turn L indicator 21, a turn R indicator 23, a fuel indicator 25 for indicating a remaining amount of fuel, a water temperature indicator 27 for indicating a water temperature, and a warning light 29 for giving warning of not fastening of a seat belt or of forgetting to turn off lights.

Figure 2:
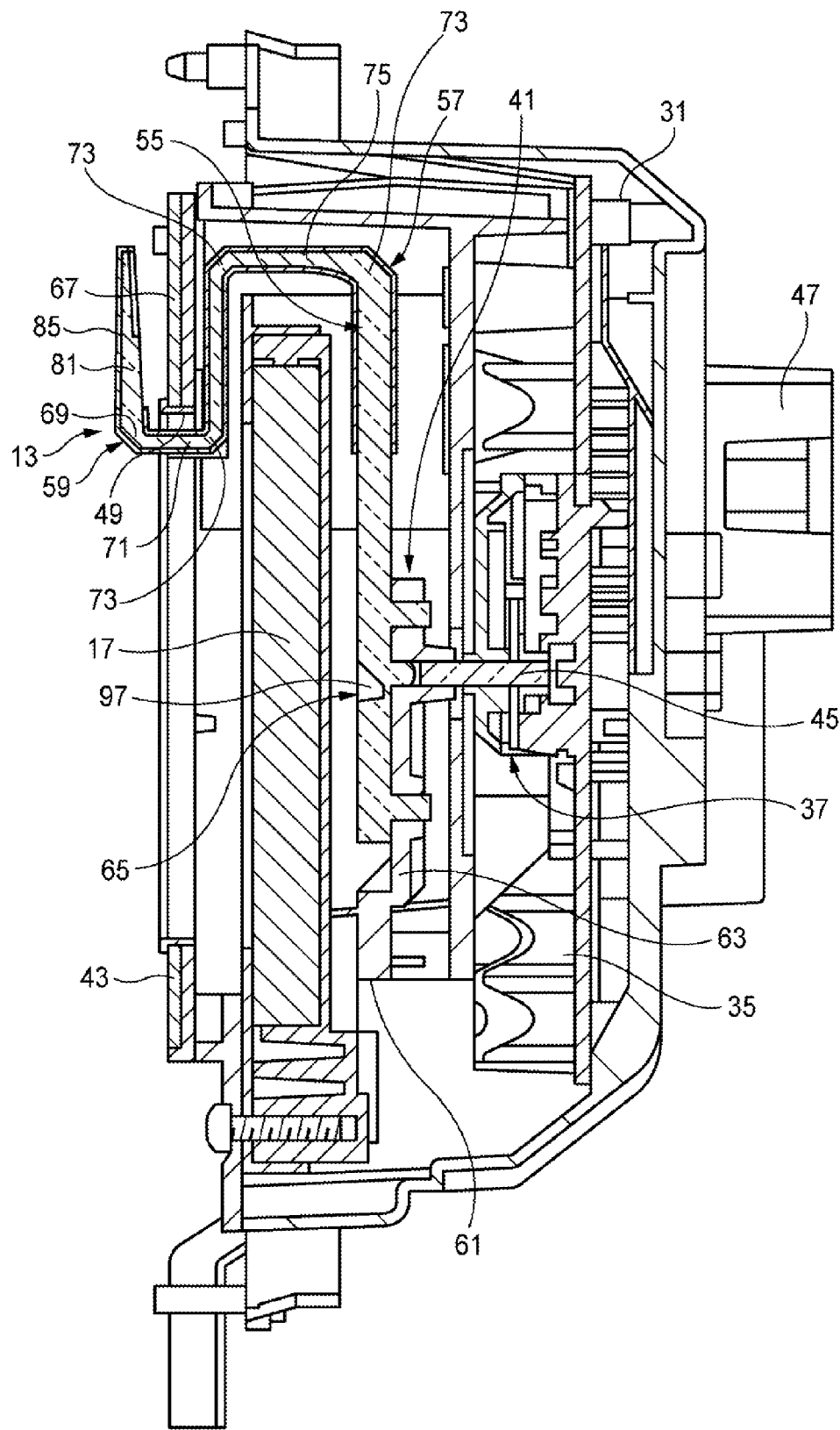
FIG. 2 is a vertical sectional view of the combination meter shown in FIG. 1.

As shown in FIG. 2, the speedometer 15, the multi-display 19, the turn L indicator 21, the turn R indicator 23, the fuel indicator 25, the water temperature indicator 27 and the warning light 29 are housed in a casing 31 of the combination meter 11. The casing 31 is attached with an inside cover 33 (see FIG. 1) at a front face thereof so that the inside cover 33 conceals those housed in the casing 31 such as a circuit board 35 and a drive section 37. A cover glass 39 is attached at a front of the casing 31.

The speedometer 15 is equipped with a spontaneous light pointer device 41. The spontaneous light pointer device 41 includes a spontaneous light pointer 13, a dial plate 43, a drive section 37 disposed behind the LCD 17, a rotating shaft 45 arranged to be rotated by the drive section 37, a circuit board 35 on which the drive section 37 is mounted, and a connector 47 for external connection of the circuit board 35 to a wire harness of a vehicle body. The dial plate 43 is formed in a doughnut form in front view having centrally a generally circular aperture 49, in which a speed scale 51 is formed along an outer periphery thereof. The LCD 17 is arranged in back of the dial plate 43 so that it can be seen from front through the aperture 49 of the dial plate 43. Namely, the LCD 17 assumes a form that is surrounded by an inner edge (edge region) 53 of the dial plate 43.

Figure 3:
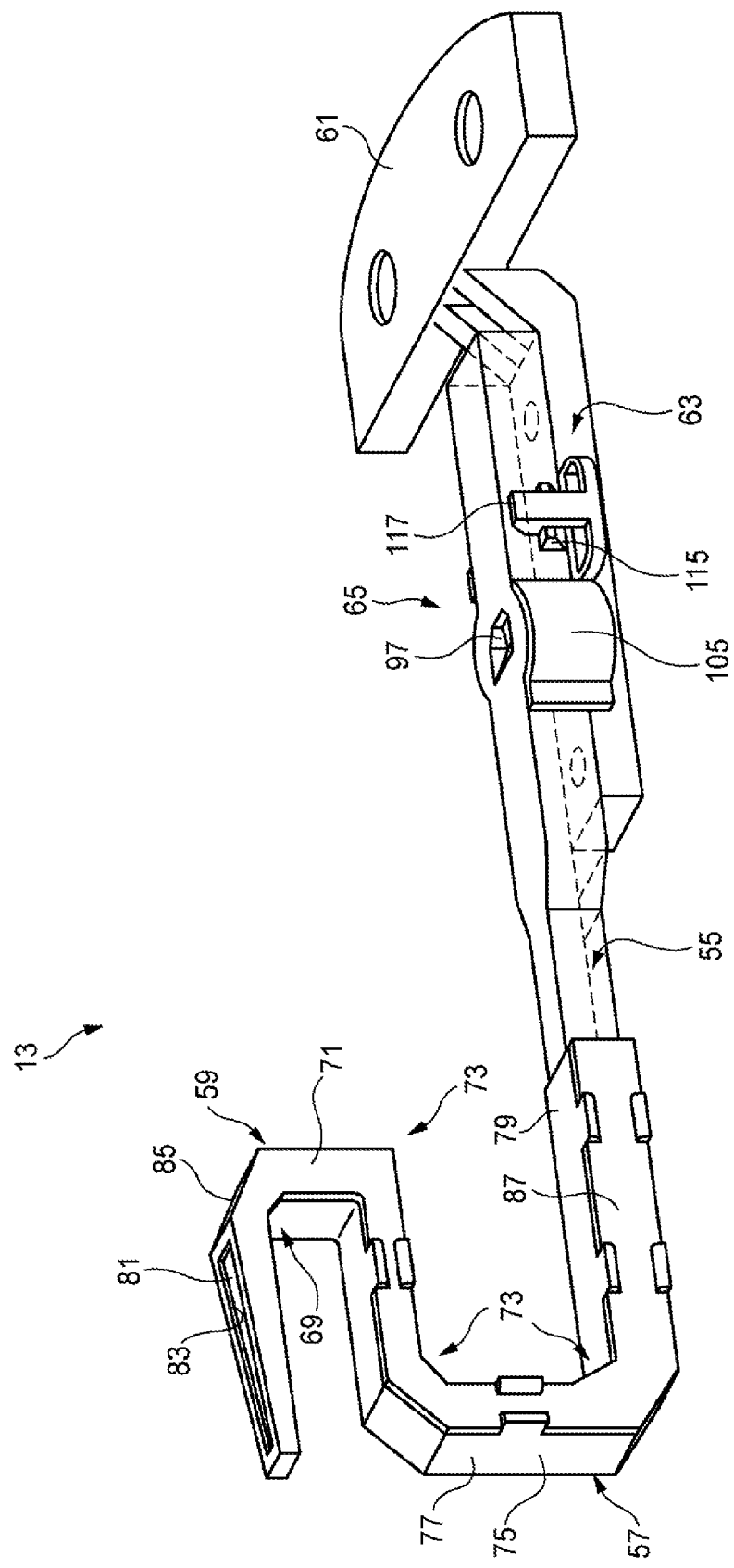
FIG. 3 is an overall perspective view of a spontaneous light pointer shown in FIG. 2.

The spontaneous light pointer 13 having a pointer structure according to the present embodiment includes a pointer main body 55, a main cover 57, a sub-cover 59 and a support 63 having a counterbalance 61, as shown in FIG. 3. The pointer main body 55 is formed with a light incident region 65 in a position closer to a base end thereof. The pointer main body 55 is formed of a transparent resin material as a light guide member capable of inputting light from a light source, not shown, and propagating it through an interior thereof. The resin material is not limitative but can employ PMMA (polymethylmethacrylate), PC (polycarbonate), PS (polystyrene), COP (cyclic olefin polymer) or the like, in respect of light transmissivity and formability. The main cover 57 and the sub-cover 59 are each formed of a light-shielding material or with a light-shielding film so that light can be blocked from exiting toward a main surface of the dial plate 43 through regions except for the window 83 referred later.

The pointer main body 55 in the present embodiment has at a tip a pointer visualizing portion 81 arranged extending along a surface 67 of the dial plate 43. As shown in FIG. 3, the pointer main body 55 has a pointer neck portion 71 continuing to the pointer visualizing portion 81 through a pointer bend portion 69 and extending along from an inner edge 53 of the dial plate 43 to a backside of the dial plate 43. By connecting the pointer neck portion 71 with a U-shaped bend portion 75 having three pointer bend portions 73 in a position closer to the pointer base end, the pointer main body 55 is formed in a generally S-shape closer to the tip thereof. This permits the pointer visualizing portion 81 to point the speed scale 51 on the dial plate 43 arranged frontward of the LCD 17 with design improvement, even if the drive section 37 lies in back of the LCD 17.

The main cover 57 is formed in a trough form sandwiching the pointer main body 55 in a region closer to the pointer base end than the pointer neck portion 71, by a first sidewall 77 and a second sidewall 79 continuing therefrom into confrontation through a bottom wall (not shown). As shown in FIG. 3, the main cover 57 is fitted to the pointer main body 55 only in its S-shaped region closer to the tip thereof.

The sub-cover 59 has an L-shaped cover portion 85 formed with a window 83 through which the pointer visualizing portion 81 is exposed and covering both side surfaces of the pointer visualizing portion 81 and both side surfaces of the pointer bend portions 69, 73 and pointer neck portion 73. An L-shaped cover sidewall covering one of the neck side surfaces continues with a lid portion 87 closing an opening spanning between the first sidewall 77 and the second sidewall 79.

The lid portion 87 closing the opening is secured to the opening through a claw-engagement structure provided between the first and second sidewalls 77, 79 and the lid portion 87.

Figure 4A:
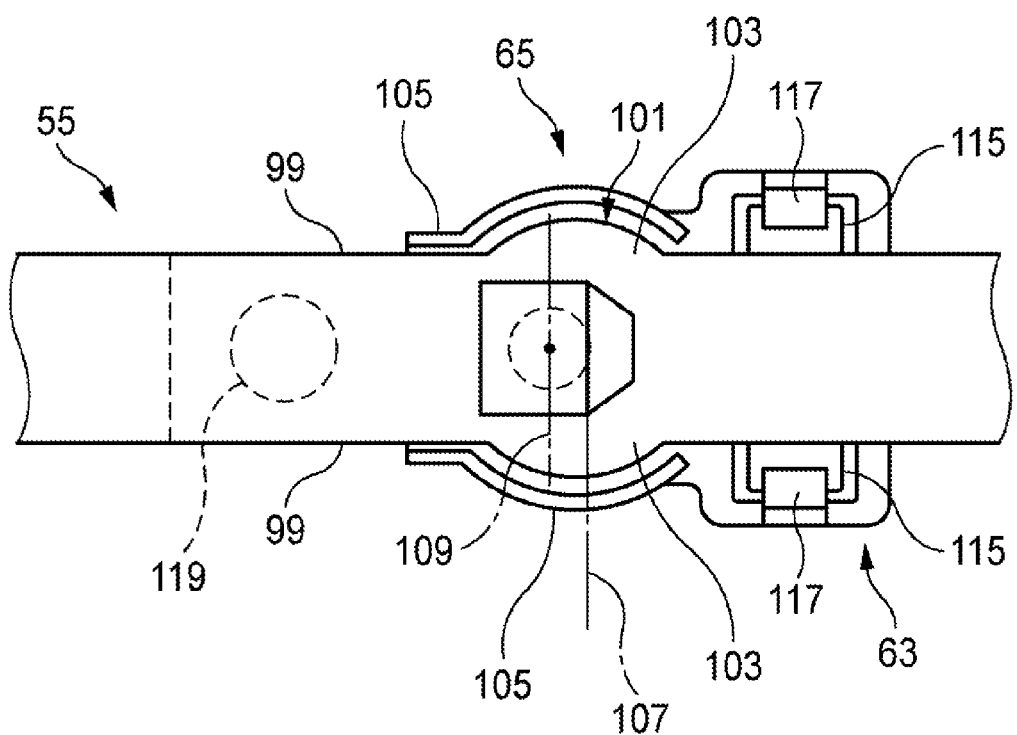
FIG. 4A is an essential-part plan view of the spontaneous light pointer shown in FIG. 3
Figure 4B:
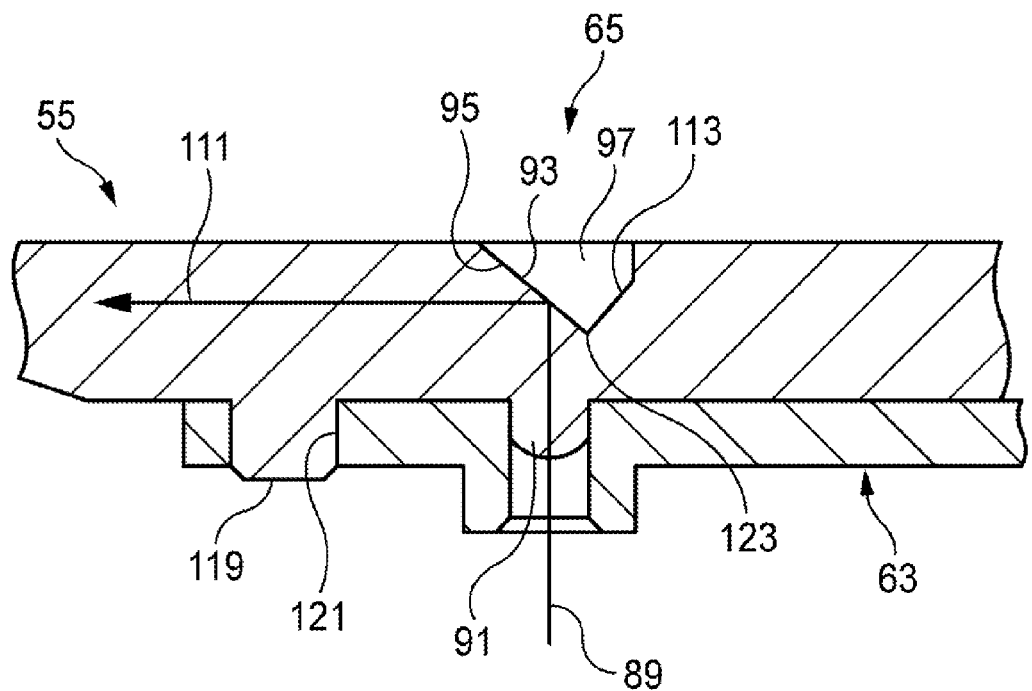
FIG. 4B is a vertical sectional view of FIG. 4A.
Figure 5A:
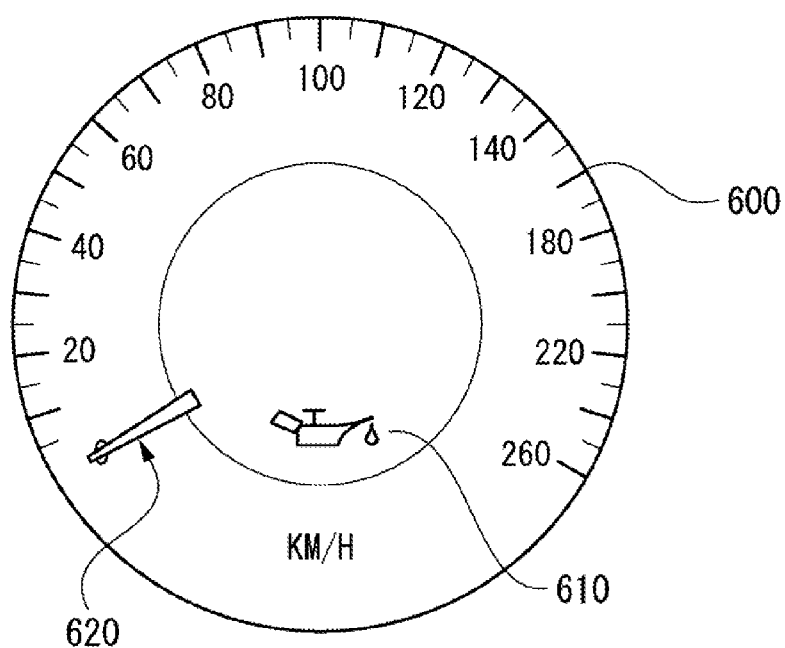
FIG. 5A is a front view showing one example of a conventional pointer device and FIG. 5B is a fragmentary sectional view of the pointer device shown in FIG. 5A.
Figure 5B:
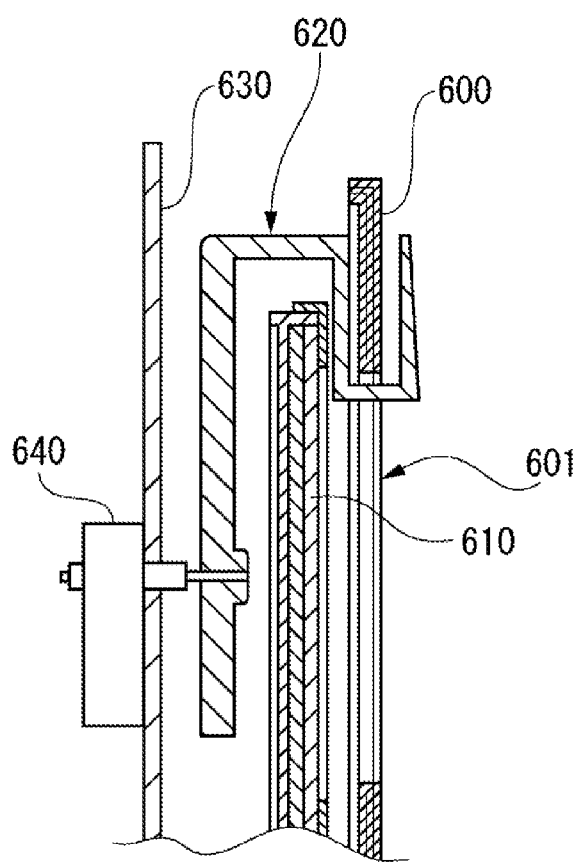
Figure 6:
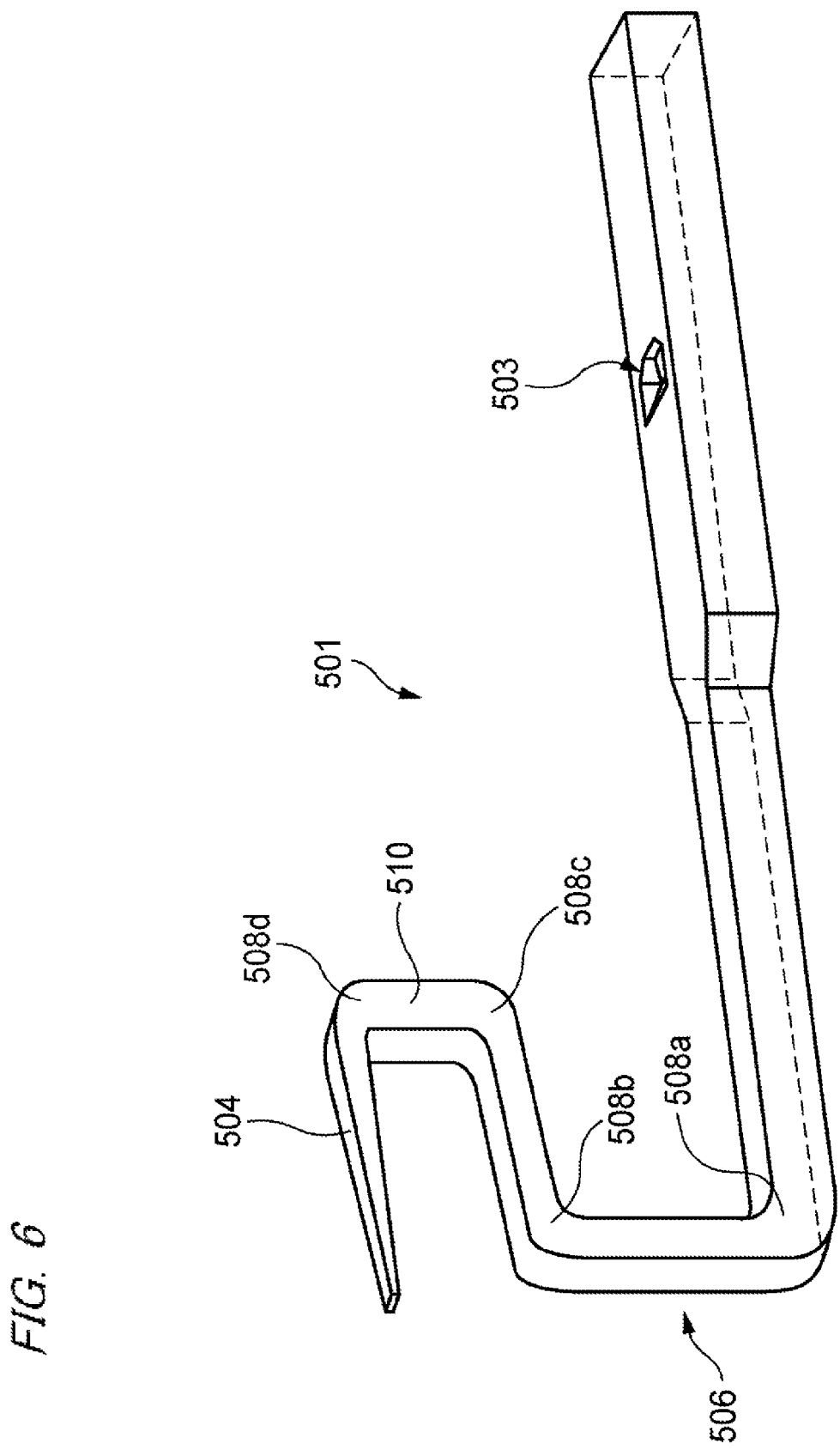
FIG. 6 is an overall perspective view showing a reference example of a pointer main body.
Figure 7A:
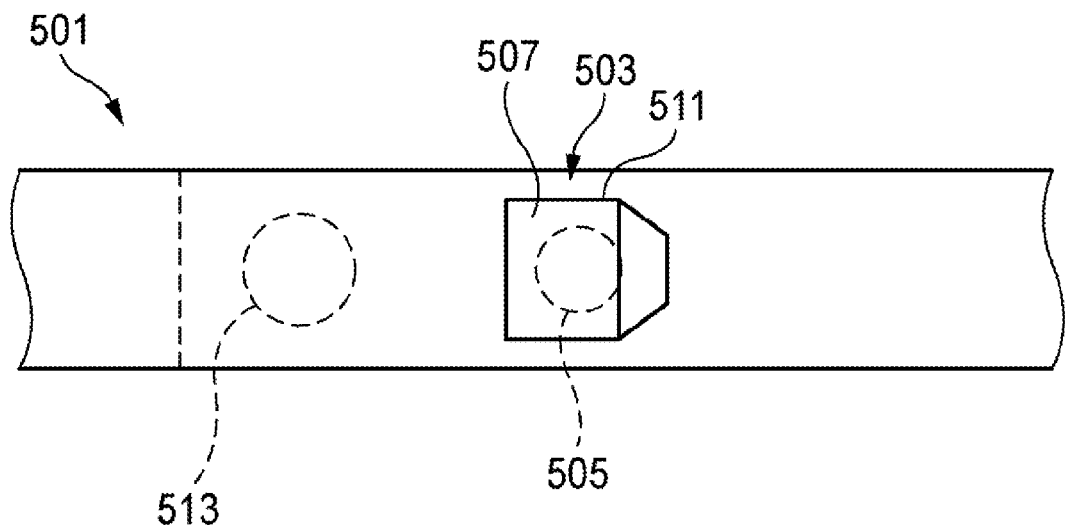
FIG. 7A is an essential-part plan view showing the pointer main body shown in FIG. 6
Figure 7B:
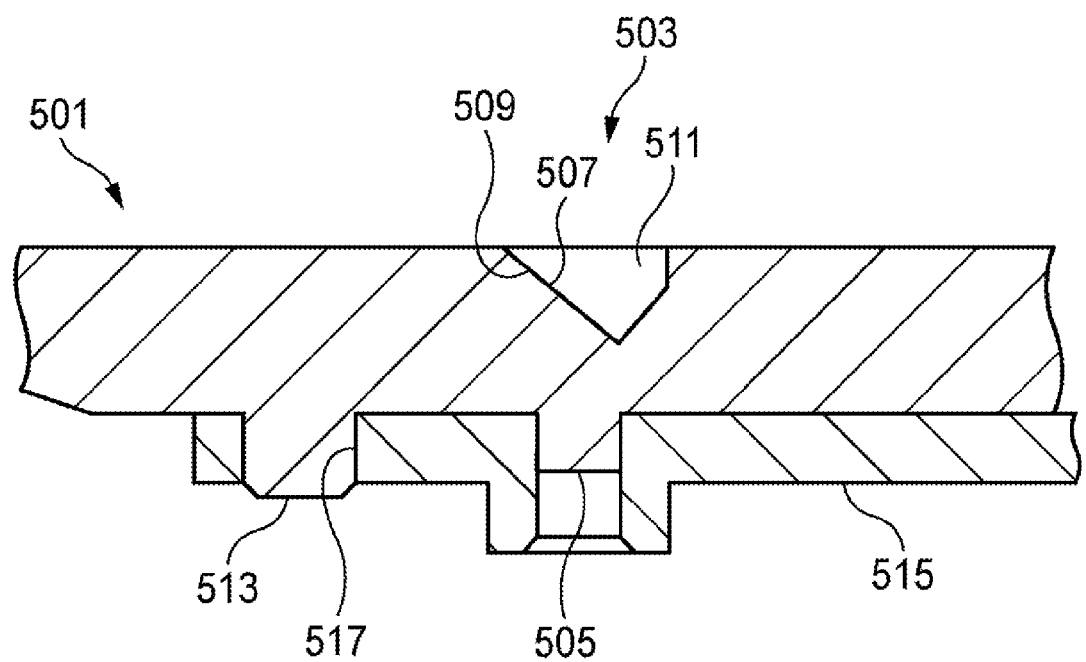
FIG. 7B is a vertical sectional view of FIG. 7A.

The pointer main body 55 in the present embodiment is configured to propagate a ray of light 89, incident from a light source through a light incident region 65 closer to the pointer base end, to the pointer visualizing portion 81 closer to a pointer tip (leftward, in the figure), as shown in FIGS. 3 and 4. In the light incident region 65, a light-receiving portion 91 is provided in a convex-lens form in one of opposite surfaces (lower surface, in FIG. 4B) of the pointer main body 55 so as to improve light transmissivity. In the other surface (upper surface, in FIG. 4B) of the pointer main body 55, a recess 97 is provided with an inclined bottom surface 93 whose backside serves as a reflection surface 95 for a ray of light incident through the light-receiving portion 91. The light incident region 65 has side surfaces 99, sandwiched between the one surface and the other surface, in which extension portions 101 are provided respectively.

In the present embodiment, the extension portions 101 are respectively formed by semi-circular cylinders (specifically, two smaller-volume parts obtained by dividing a circular cylinder along a plane including a pair of generating lines) 103 whose generating lines extend parallel with a direction of forming the recess 97 (vertically, in FIG. 3). The semi-circular cylinders 103 are clamped by a pair of arcuate clamping walls 105 formed on the support 63.

Furthermore, the extension portions 101 have their center 107 positioned offset reverse in direction to traveling of a reflection ray of light 111 with respect to a center 109 of the reflection surface 95 (rightward, in FIG. 4). Incidentally, the recess 97 has a steeply inclined bottom surface 113 opposite to the inclined bottom surface 93. The recess 97 is the deepest at an intersection of the steeply inclined bottom surface 113 and the inclined bottom surface 93. Note that, naturally, the shape of the recess forming the reflection surface is not limited to the recess 97 of the present embodiment but can take a variety of forms depending upon the gist of the present invention.

Protuberances 115 are provided protruding respectively from side surfaces 99 in positions close to the extension portions 101. By engaging claws 117 of the support 63 respectively with the protuberances 115, the pointer main body 55 is secured unseparable on the support 63. A boss 119 protrudes in one surface of the pointer main body 55. By receiving the boss 119 in a positioning hole 121 of the support 63, the pointer main body 55 is placed in position with the support 63.

Next, the function of the pointer structure configured as above will be described.

The pointer main body 55 having a pointer structure according to the embodiment has, in its light incident region 65, extension portions 101 provided in respective side surfaces 99 sandwiched between one and the other surfaces thereof. Thus, the pointer main body 55 is increased in its cross-sectional area of resin flow path at between the recess 97 and the extension portions 101. This reduces the resistance to resin flow and improves the fluidity of resin during forming a pointer so that troubles upon forming, e.g. short shot or surface sink, are less to occur.

In addition, the pointer main body 55 in the present embodiment has, upon forming a pointer, a resistance to resin flow smaller as compared with that to a shape of extension portions with corners because die surfaces for extension portions 101 define part of a circular cylinder upon injecting a resin to the extension portions 101.

In addition, in the pointer main body 55 in the present embodiment, the extension portions 101 have their center 107 positioned deviated from a center 109 of the reflection surfaces 95 in a manner coincident with one end 123 of the reflection surface 95 which is the deepest in the recess 97 and a lower end of the inclined bottom surface 93, as shown in FIG. 4. As a result, the pointer main body 55 is increased in the cross-sectional area of resin flow path and decreased in the resistance to resin flow, around the one end 123 of the reflection surface 95 where the cross-sectional area thereof is smaller.

Furthermore, in the pointer main body 55 in the present embodiment, the pointer main body 55 is secured on the support 63 by engaging the claws 117 respectively with protuberances 115 protruding in both side surfaces 99. Incidentally, although the protuberances 115 protruding from the respective surfaces 99 somewhat increase the cross-sectional area of resin flow path during forming a pointer, they do not act to reduce the resistance to resin flow to such an extent that requires to improve troubles, such as short shot or surface sink, encountered upon forming.

Namely, according to the pointer main body 55 of the present embodiment, the pointer main body 55 is not required to be broadened uniformly in order to ensure a required cross-sectional area of resin flow path. Because the pointer itself is not increased in weight due to size increase, a drive section 37 is not required to increase its drive power, so that size increase and cost rise are not incurred for the pointer device overall.

According to the pointer main body 55 having a pointer structure of the present embodiment, troubles upon forming can be suppressed without size increase.

Incidentally, the present invention is not limited to the above embodiment but can be modified, improved or so appropriately. Besides, the components in the embodiment are arbitrary and not limitative in respect of their materials, shapes, dimensions, number, arrangement points or the like as long as the present invention can be achieved.

For example, the pointer main body 55 of the spontaneous light pointer 13 in the present embodiment has a pointer neck portion 71 continuing with the pointer visualizing portion 81 through a pointer bend portion 69 and extending along from an inner edge 53 of the dial plate 43 to a backside of the dial plate 43. By continuing the pointer neck portion 71 with a U-shaped bend portion 75 in a position closer to the pointer base end, a generally S-shape is given with four pointer bend portions 69, 73 in a region closer to the tip of the pointer main body. However, the pointer structure according to the present invention is not limited to the above. Namely, a pointer main body can be configured with a generally J-shape at its tip and two pointer bend portions, by providing a pointer neck portion continuing with a pointer visualizing portion through a pointer bend portion and extending along from an outer edge of a dial plate to a backside of the dial plate and by continuing a straight extension portion from the pointer neck portion closer to the base end of the pointer.

What is claimed is:

1. A pointer structure comprising:
a pointer main body configured to propagate a ray of light, incident through a light incident region provided closer to a pointer base end, to a pointer visualizing portion closer to a tip thereof;
a light-receiving portion provided in the light incident region in one surface of opposite surfaces of the pointer main body;
a recess provided in another surface of the opposite surfaces of the pointer main body and having an inclined bottom surface whose backside serves as a reflection surface for a ray of light incident through the light-receiving portion; and
extension portions provided in the light incident region in respective side surfaces sandwiched between the one surface and the another surface.

2. The pointer structure according to claim 1, wherein the extension portions are semi-circular cylinders whose generating lines extend parallel with a direction of forming the recess.

3. The pointer structure according to claim 1, wherein the extension portions have a center positioned offset reverse in direction to traveling of a reflection ray of light with respect to a center of the reflection surface.

4. The pointer structure according to claim 1, wherein protuberances are provided protruding in the respective side surfaces nearby the extension portions so that the pointer main body can be secured on a support by engaging claws of the support with the protuberances.

* * * * *